US010259638B2

(12) United States Patent
Linton et al.

(10) Patent No.: US 10,259,638 B2
(45) Date of Patent: Apr. 16, 2019

(54) HEAT MODULATING FOOD PACKAGING MATERIAL

(71) Applicant: ILLINOIS TOOL WORKS INC., Glenview, IL (US)

(72) Inventors: Joshua M. Linton, Chicago, IL (US); Giorgio Grimaldi, Northbrook, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 302 days.

(21) Appl. No.: 15/059,976

(22) Filed: Mar. 3, 2016

(65) Prior Publication Data
US 2017/0253414 A1 Sep. 7, 2017

(51) Int. Cl.
| H05B 6/64 | (2006.01) |
| H05B 6/68 | (2006.01) |
| H05B 6/70 | (2006.01) |
| A47J 36/02 | (2006.01) |
| B65D 81/34 | (2006.01) |

(52) U.S. Cl.
CPC ........ *B65D 81/3446* (2013.01); *A47J 36/027* (2013.01); *H05B 6/6408* (2013.01); *H05B 6/6494* (2013.01); *H05B 6/687* (2013.01); *H05B 6/70* (2013.01); *H05B 6/705* (2013.01); *B65D 2581/3487* (2013.01)

(58) Field of Classification Search
CPC ...... H05B 6/6494; H05B 6/687; H05B 6/705; H05B 6/6408; H05B 6/70; B65D 81/3446; B65D 81/2581; B65D 81/3487
USPC ............... 219/506, 601, 690, 702, 728, 747; 426/107, 233, 242
See application file for complete search history.

(56) References Cited

U.S. PATENT DOCUMENTS

| 5,391,430 A * | 2/1995 | Fabish ................... H05B 6/80 219/728 |
| 2006/0008600 A1 | 1/2006 | Appleton et al. |
| 2009/0095740 A1* | 4/2009 | Buchala ............ B65D 81/3446 219/725 |

FOREIGN PATENT DOCUMENTS

| EP | 2230881 A1 | 9/2010 |
| EP | 2239994 A1 | 10/2010 |
| WO | 2012/001523 A2 | 1/2012 |

OTHER PUBLICATIONS

Invitation to Pay Additional Fees from corresponding International Application No. PCT/US2017/020082 dated May 22, 2017.
International Search Report and Written Opinion from corresponding International Application No. PCT/US2017/020082 dated Jul. 14, 2017.

\* cited by examiner

*Primary Examiner* — Thien S Tran
(74) *Attorney, Agent, or Firm* — Burr Forman McNair (57) ABSTRACT

An oven may include a cooking chamber configured to receive a heat modulating material (HMM), a radio frequency (RF) heating system configured to provide RF energy into the cooking chamber, and a cooking controller configured to control the frequency of RF energy provided by the RF heating system into the cooking chamber. The MINI may be configured to contain a food product and may include a thermally active section. The thermally active section may include a base matrix and a particulate material dispersed in the base matrix.

16 Claims, 9 Drawing Sheets

HEAT MODULATING FOOD PACKAGING MATERIAL

TECHNICAL FIELD

Example embodiments generally relate to cooking technology and, more particularly, relate to a heat modulating material that is configured to have heat zones that can be selectively activated based on the selective application of frequencies and/or phases.

BACKGROUND

Microwave cooking may be employed to cook food products. In particular, the microwave may be used to speed up the cooking process or as a quick-cooking process. However, a microwave typically cannot be used to cook some food products and also microwave energy alone cannot brown food products. The packaging or the container of the food product may be utilized in order to both cook and brown the food product in a microwave. In order to sear or brown the food product, the packaging or container may contain a coating of material that absorbs energy transmitted by the microwave in order to sear or brown a surface of the food product.

In some cases, the coating provided in the container may not provide the desired browning of the food product. For example, the coating provided on the container may unsuccessfully brown the food product, or in some cases, cause overbrowning of the food product. Thus, it may be desirable to provide further improvements of materials that could be used for a cooking container in order to achieve the desired amount of heating and browning of the food product.

BRIEF SUMMARY OF SOME EXAMPLES

Some example embodiments may provide oven that employs a single heat energy application source, but is capable of providing heat energy via at least two different methods via the single heat energy application source (e.g., an electromagnetic energy source such as a solid state or magnetron-based microwave source) and via a heat modulating material (HMM). For example, application of radio frequency (RF) energy may be propagated within a cooking chamber and directly heat food product, and the HMM may include a thermally active section having a carrier matrix having different particulate material or concentrations of the same particulate material for absorbing the RF energy to indirectly heat the food product via the RF energy. Depending on the frequency (and/or phase) of the RF energy being propagated in the cooking chamber, the HMM may be sensitive to the frequency (or phase) of electromagnetic energy and convert a certain frequency of applied energy into thermal energy in the form of heat at the thermally active section of the MINI to provide convective/conductive heating along with the direct RF energy heating, all from a single heat energy application source (e.g., a solid state or magnetron-based RF generator). Thus, one RF energy source can power both RF and at least one other heat application or cooking method.

In an example embodiment, an oven is provided. The oven may include a cooking chamber configured to receive a HMM, a radio frequency (RF) heating system configured to provide RF energy into the cooking chamber, and a cooking controller configured to control the frequency of RF energy provided by the RF heating system into the cooking chamber. The MINI may be configured to contain a food product and may include a thermally active section. The composition of the thermally active section may include a base matrix and a particulate material dispersed in the base matrix. Determination of the relative quantity of the dispersed particulate within or upon the MINI is determined by the responsivity of a given particulate material as well as the optical density of its dispersion at a certain frequency and/or phase combination. Additionally, the particular cooking objectives (i.e., the desired effects the user has for the application of heat to a given food product) will also influence the decisions made in the creation and composition of an HMM.

In another example embodiment, a HMM, which is essentially an energy conversion assembly, is provided. The energy conversion assembly may be useable in an oven and configured to contain a food product. The HMM may include a base matrix and a particulate material dispersed in the base matrix. The particulate material may be configured to absorb at least some of the RF energy provided in a cooking chamber of the oven to transform the RF energy into thermal energy for indirectly heating the food product. The application of the RF energy in the cooking chamber may be directed by a cooking controller of the oven. Some example embodiments may improve the browning the food product in the microwave and improve the operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Furthermore, as used herein the term "browning" should be understood to refer to the Maillard reaction, caramelization or other desirable food coloration reactions whereby the food product is turned brown via enzymatic or non-enzymatic processes.

Some example embodiments may improve the cooking performance of an oven and/or may improve the operator experience of individuals employing an example embodiment. In this regard, a heat modulating material (HMM) may be provided to include a thermally active section having a base matrix. The material is referred to as a heat "modulating" material because the materials used are thermally activated by the application of frequency. Since the oven in which the HMM is placed is configured to control the application of frequency to selectively activate the thermally activated portions of the HMM, heat application can be modulated through frequency control and/or phase control (e.g., frequency and phase shifting). The base matrix may have different concentrations of particulate material to designate different portions of the thermally active section of the HMM to provide different heat generation and/or heat transfer properties. The oven, in which a HMM may be placed for cooking, may be enabled to allow a single energy source (e.g., an RF energy source capable of operating at multiple selectable frequencies) to be used to generate both RF heating and convention/conduction heating. As such, some embodiments may also employ a single heat energy source to power two different cooking methods. Thus, the same RF energy source can cook the food product contained in the HMM via two methods (one direct, and one indirect) at the same time. Moreover, one such method may be capable of providing browning. Example embodiments may therefore assist with the provision of a properly browned, but also well finished product.

In some example embodiments, the HMM may be sensitive to a particular frequency that can be selectively activated. The particular frequency could be distinct from the frequency used for directly heating the food, or could be within the band of frequencies used to directly heat the food. However, example embodiments provide for selectively employing direct and indirect heating by selectively applying the particular frequency (for indirect heating) and the frequency used for directly heating the food.

Figure 1:
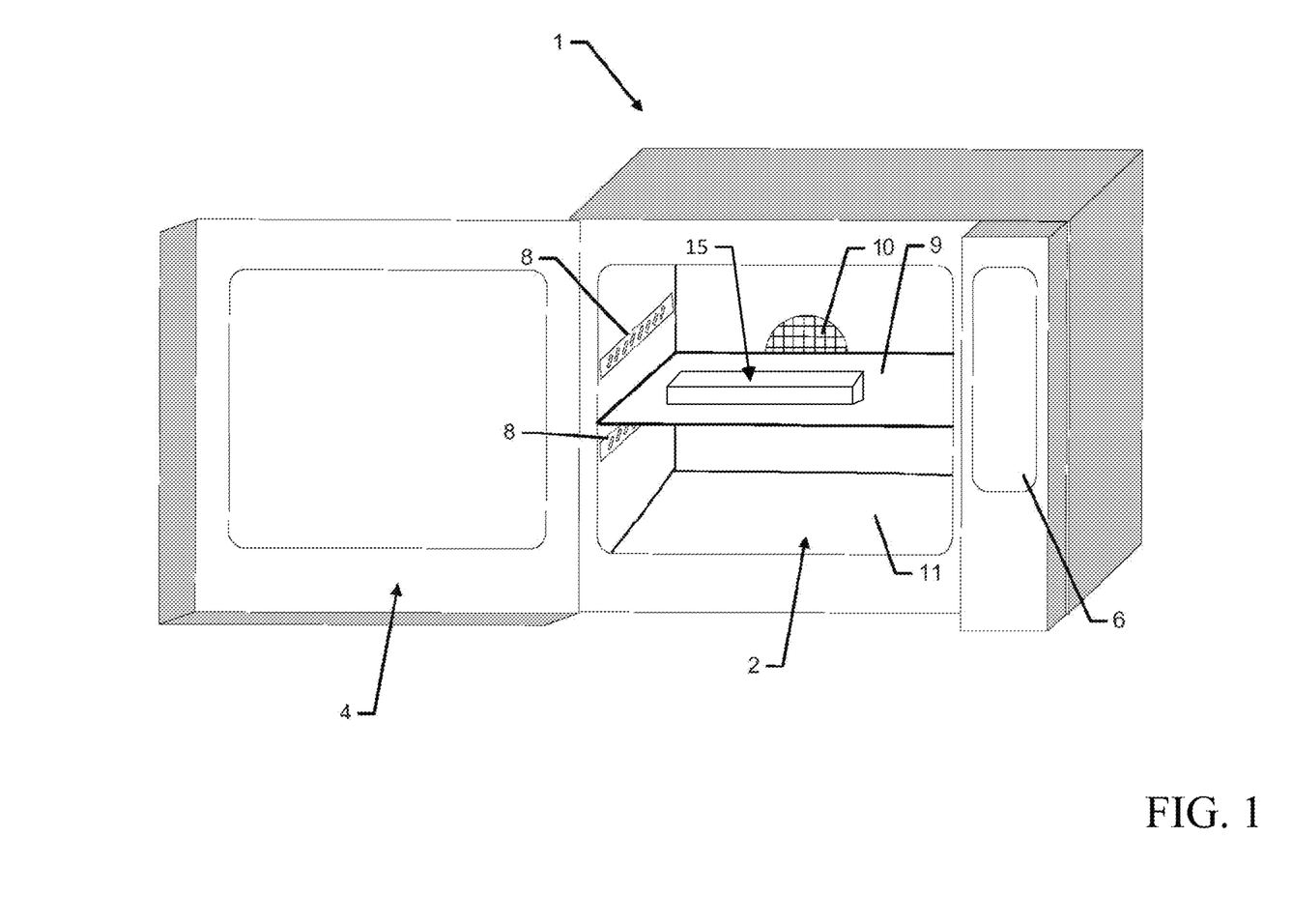
FIG. 1 illustrates a perspective view of an oven into which a heat modulating material may be placed.

FIG. 1 illustrates a perspective view of an oven 1 according to an example embodiment. As shown in FIG. 1, the oven 1 may include a cooking chamber 2 into which a HMM 15 may be placed. The HMM 15 may contain a food product and heat may be applied directly or indirectly to the food product 60 by any of at least two heat application sources that may be employed by the oven 1. The oven 1 may include a door 4 and an interface panel 6, which may sit proximate to the door 4 when the door 4 is closed. In an example embodiment, the interface panel 6 may include a touch screen display capable of providing visual indications to an operator and further capable of receiving touch inputs from the operator. However, other interface mechanisms are also possible. The interface panel 6 may be the mechanism by which instructions are provided by the operator, and the mechanism by which feedback is provided to the operator regarding cooking process status, options and/or the like.

In some embodiments, the oven 1 may include one or more rack (or pan) supports or guide slots in order to facilitate the insertion of one or more racks 9 that are configured to hold the MINI 15. Although no forced air is required in some embodiments, in others, one or more jet plates 8 may be positioned proximate to the rack supports or corresponding racks 9 to enable air to be forced over a surface of the HMM 15 placed on the rack 9 via air delivery orifices disposed in the jet plates 8. The HMM 15, and the food product 60 contained therein, may be placed on any of the racks 9 provided in the oven 1 (or simply on a base of the cooking chamber 2 in embodiments where racks 9 are not employed) and heated at least partially using radio frequency (RF) energy.

In an example embodiment, if forced air is employed, air may be drawn out of the cooking chamber 2 via a chamber outlet port 10 disposed at a rear wall (i.e., a wall opposite the door 4) of the cooking chamber 2. Air may be circulated from the chamber outlet port 10 back into the cooking chamber 2 via the air delivery orifices in the jet plates 8. After removal from the cooking chamber 2 via the chamber outlet port 10, air may be cleaned, heated, and pushed through the system by other components prior to return of the clean, hot and speed controlled air back into the cooking chamber 2. Of note, some embodiments may not employ forced air flow, and thus, the chamber outlet port 10 and the jet plates 8 may either be eliminated, or unused. They could also be arranged differently in some embodiments where they are used.

Figure 2:
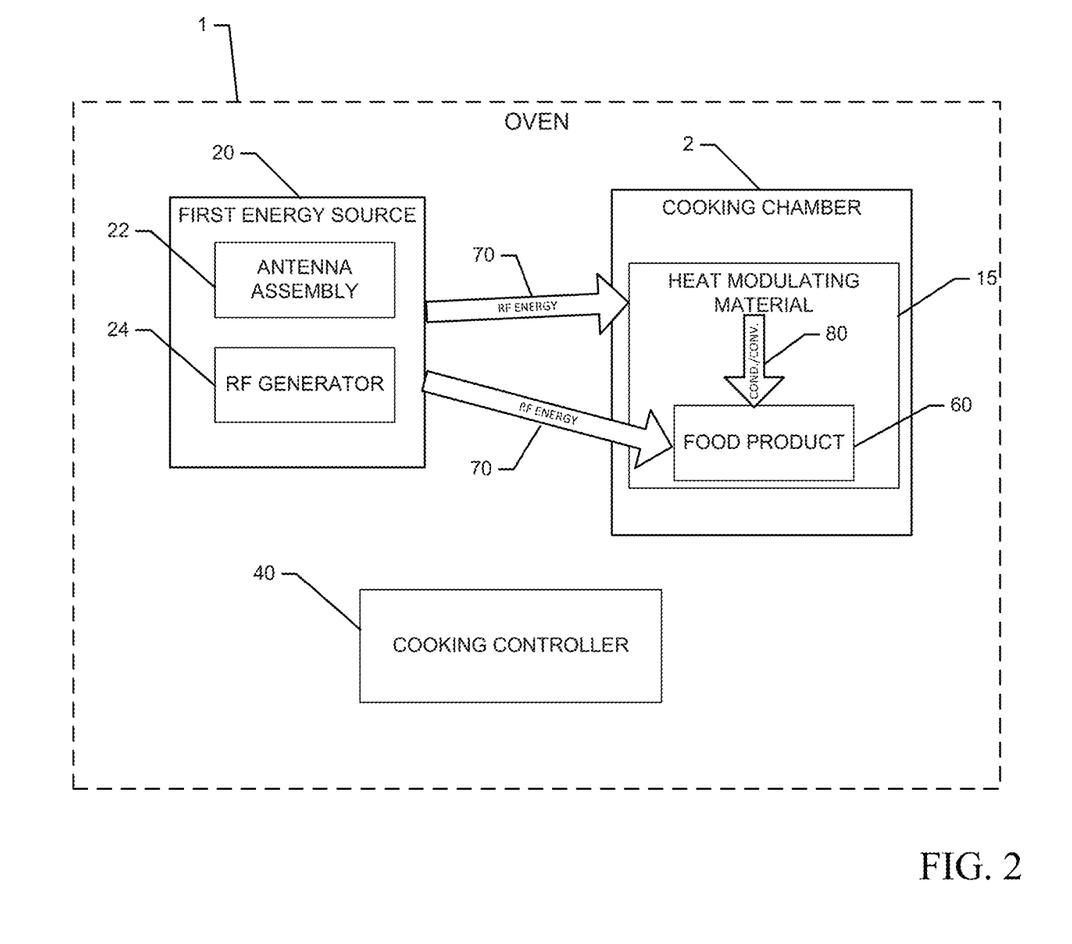
FIG. 2 illustrates a functional block diagram of the oven of FIG. 1 according to an example embodiment.

As indicated above, some example embodiments may employ a single energy source to provide two different heat application methods. FIG. 2 illustrates a functional block diagram of the oven 1 according to an example embodiment. As shown in FIG. 2, the oven 1 may include at least a first energy source 20. Although not required (and absent from some embodiments), it is also possible that a second energy source could be included. If employed, the second energy source may be, for example, a convective heating source. However, since the second energy source is not required, the example of FIG. 2 will be described in reference only to the first energy source 20. The first energy source 20 of an example embodiment may be an RF heating source.

In an example embodiment, the first energy source 20 may be a radio frequency (RF) energy source (or RF heating source) configured to generate relatively broad spectrum RF energy or a specific narrow band, phase controlled energy source to cook food product placed in the cooking chamber 2 of the oven 1. Thus, for example, the first energy source 20 may include an antenna assembly 22 and an RF generator 24. The RF generator 24 of one example embodiment may be configured to generate RF energy at selected levels over a range of frequencies including conventional microwave oven frequencies of about 2.45 GHz. However, other RF energy bands may be employed in some cases, such as 13 MHz to 1 GHz. The antenna assembly 22 may be configured to transmit the RF energy into the cooking chamber 2. In some cases, the antenna assembly 22 may further be configured to receive feedback to indicate absorption levels of respective different frequencies in the food product. The absorption levels may then be used to control the generation of RF energy to provide balanced cooking of the food product 60. In some embodiments, the antenna assembly 22 may include multiple antennas. Thus, for example, four antennas may be provided and, in some cases, each antenna may be powered by its own respective power module of the RF generator 24 operating under the control of a cooking controller 40 to operate at different frequencies simultaneously. In an alternative embodiment, a single multiplexed generator may be employed to deliver different energy into each compartment of the cooking chamber 2.

In an example embodiment, the feedback driven responsiveness of the first energy source 20 may provide for a relatively high degree of uniformity in the cooking achieved. For example, if some frequencies generated by the RF generator 24 are being absorbed more or less in certain regions, the feedback provided to the RF generator 24 may enable more even application of desired frequencies to give a more uniform RF absorption profile within the cooking chamber 2. However, other example embodiments may not measure absorption or feedback at all.

In some example embodiments, the first energy source 20 may be controlled, either directly or indirectly, by the cooking controller 40. The cooking controller 40 may include processing circuitry (e.g., a processor and memory) configured to store instructions and execute the same in order to control a cooking process via the control of various components of the oven 1. Thus, for example, the cooking controller 40 may be understood to execute one or more algorithms defining cooking processes for the oven 1. In an example embodiment, algorithms executed by the cooking controller 40 may include instructions for shifting frequencies and phases according to a guiding logic. Consequently, example embodiments provide the ability to create unique cooking "strategies" or "techniques" based upon the relationship of a given food product, the particular composition and configuration of the HMM, and the unique algorithm which distributes energy within the oven cavity. As described herein, the cooking controller 40 may be configured to execute algorithms that control the temporal, qualitative and quantitative aspects associated with the application of frequency to different materials, and directly to the food product 60 to employ the unique techniques and strategies.

The cooking controller 40 may be configured to receive inputs descriptive of the food product, recipe selection and/or cooking conditions (e.g., via the interface panel 6) in order to provide instructions or controls to the first and second energy sources 20 and 30 to control the cooking process. In some embodiments, the cooking controller 40 may be configured to receive static and/or dynamic inputs regarding the food product and/or cooking conditions. Dynamic inputs may include feedback data regarding absorption of RF spectrum, as described above. In some cases, dynamic inputs may include adjustments made by the operator during the cooking process. The static inputs may include parameters that are input by the operator as initial conditions or selections of cooking options. For example, the static inputs may include a description of the food type, initial state or temperature, final desired state or temperature, a number and/or size of portions to be cooked, a location of the item to be cooked (e.g., when multiple racks 9 are employed), and/or the like.

In an example embodiment, the cooking controller 40 may be configured to access data tables that define RF cooking parameters used to drive the RF generator 24 to generate RF energy at corresponding levels and/or frequencies for corresponding times determined by the data tables based on initial condition information descriptive of the food product and/or based on feedback indicative of RF absorption. As such, the cooking controller 40 may be configured to employ RF cooking as a primary energy source for cooking the food product. However, other energy sources (e.g., secondary and tertiary or other energy sources) may also be employed in the cooking process. The data tables may also define specific frequencies to apply at corresponding different times or in different sequences.

In some cases, cooking signatures, programs or recipes may be provided to define the cooking parameters to be employed for each of multiple potential cooking stages that may be defined for the food product 60 and the cooking controller 40 may be configured to access and/or execute the cooking signatures, programs or recipes. In some embodiments, the cooking controller 40 may be configured to determine which program to execute based on inputs provided by the user except to the extent that dynamic inputs (i.e., changes to cooking parameters while a program is already being executed) are provided. In an example embodiment, an input to the cooking controller 40 may also include browning instructions. In this regard, for example, the browning instructions may include instructions regarding the air speed, air temperature, or time of application of a set air speed and temperature combination (e.g., start and stop times for certain speed and heating combinations) if airflow is employed. The browning instructions may be provided via a user interface accessible to the operator, or may be part of the cooking signatures, programs, or recipes. Moreover, in some cases, the browning instructions may indicate a particular zone in which to place the HMM 15 to be cooked. However, in other cases, because the browning may be achieved by indirect heating using the HMM 15, the browning instructions may include instructions defining when, how long, and at what power levels to apply the particular frequency to which the HMM 15 is tuned or otherwise sensitive.

The cooking controller 40 may be configured to execute the various cooking signatures, programs, or recipes so that the food product 60 contained within the HMM 15 is effectively cooked or browned. In particular, a thermally active section of the HMM 15, as described in more detail below, may only activate at a certain frequency or frequency band, and therefore browning of the surface of the food product 60 in contact with the thermally active section of the HMM 15 may only occur at the certain frequency or frequency band or certain combinations of frequency and phases. For example, the thermally active section of the HMM 15, which is configured to enable browning of the food product 60, may only activate at a frequency band of 800 MHz-899 MHz. However, the food product 60 may only cook at a frequency of 900 MHz-1 GHz. Therefore, in order to avoid overbrowning of the food product 60, the cooking controller 40 may execute various cooking signatures, programs, or recipes that vary the frequency or frequency band provided in the cooking chamber to ensure desired doneness and brownness of the food product 60 contained in the HMM 15 based on the respective cooking signatures, programs or recipes.

Therefore, in some cases, the RF energy 70 applied may be applied in the cooking chamber 2 of the oven 1 at specific selected frequency band that is useful both for cooking the food product 60, and for activating the thermally active section of the HMM 15. Thus, for example, the frequencies for cooking and activating the HMM 15 may overlap or be nested. However, in other examples, a different frequency (or band) may be used to heat the food product 60 than the frequency (or band) used to activate the thermally active section of the HMM 15. Thus, for example, the cooking controller 40 could direct the RF generator 24 to apply two frequencies. The first frequency may be selected to be absorbed more readily by the food product 60 while the second frequency may be selected to be absorbed more readily by the thermally active section of the HMM 15.

The cooking signatures, programs, or recipes that the cooking controller 40 may execute to ensure desired doneness and brownness of the food product 60 may include, but are not limited to, a sequential activation program, a parallel activation program, and a hybrid activation program. When executing the sequential activation program, the cooking controller 40 may be configured to direct the application of a first frequency or frequency band for a predetermined period of time in the cooking chamber 2, then after the predetermined period time has expired, direct the application of a second frequency or frequency band for a predetermined period of time in the cooking chamber 2. For example, the cooking controller 40 may be configured to apply the first frequency or frequency band of 900 MHz-1 GHz for one minute e.g., to cook the food directly, then after the expiration of the one minute, the cooking controller 40 may be configured to direct application of the second frequency or frequency band of 800 MHz-899 MHz for thirty seconds e.g., to brown the food via the HMM 15. Thus, for example, the application of the first frequency or frequency band may be for direct cooking of the food product only and therefore the thermally active section of the HMM 15 may be configured to not activate and browning of the food product would not occur. However, during the application of the second frequency or frequency band, the food product 60 may stop cooking or heating and the thermally active section of the HMM 15 may activate and cause the surface of the food product 60 that is in contact with the thermally active section of the HMM 15 to brown (i.e., as indirect heating of the food product 60), as desired in greater detail below.

The parallel activation program enables simultaneous cooking and browning of the food product 60 contained in the HMM 15 via overlapping or non-overlapping frequency application. Therefore, when executing the parallel activation program, the cooking controller 40 may be configured to direct the application of a frequency or frequency band that allows for direct cooking of the food product contained in the HMM 15 and simultaneously activates the thermally active section of the HMM 15 so that the surface of the food product 60 that is contact with the thermally active section of the HMM 15 is browned. For example, the cooking controller 40 may be configured to direct application of the frequency or frequency band of 800 MHz-1 GHz for two minutes in order to both directly heat/cook the food product and activate the thermally active section of the HMM 15 to cause the surface of the food product 60 that is in contact with the thermally active section of the HMM 15 to brown.

The hybrid activation program enables the application of both sequential and overlapping frequencies or frequency bands to be provided in the cooking chamber 2. For example, the cooking controller 40 may be configured to direct the application of a first frequency or frequency band of 900 MHz-1 GHz for one minute, then after the expiration of the one-minute period, the cooking controller 40 may be configured to direct the application of a second frequency or frequency band of 800 MHz-1 GHz for thirty seconds. Then after the expiration of the thirty second period, the cooking controller 40 may be configured to direct the application of a third frequency or frequency band of 800 MHz-899 MHz may be applied for thirty seconds. In some cases, the application of the first frequency or frequency band may be for direct cooking of the food product only and therefore the thermally active section of the HMM 15 may not activate and browning of the food product 60 may not occur. During the application of the second frequency or frequency band, the food product may continue to cook and the thermally active section of the HMM 15 may be configured to activate causing the surface of the food product that is in contact with the thermally active section of the HMM 15 to brown. However, during the application of the third frequency or frequency band, the food product 60 may stop heating/cooking and the thermally active section of the HMM 15 may continue to be activated causing the surface of the food product 60 that is in contact with the thermally active section of the HMM 15 to continue browning.

Figure 3:
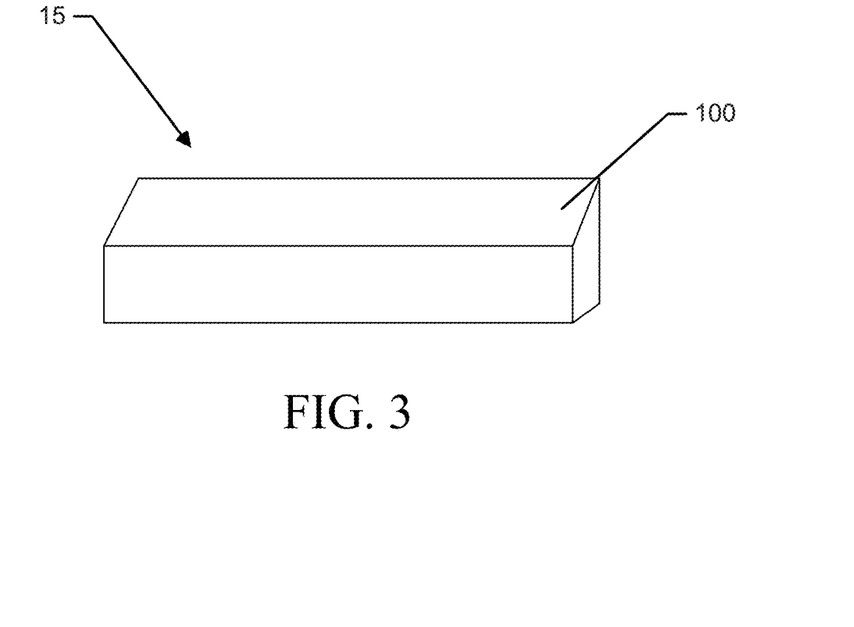
FIG. 3 illustrates a thermally active section of a heat modulating material according to an example embodiment.

As shown in FIG. 3, the HMM 15 may have one or more sides thereof formed as a thermally active section 100. In the example of FIG. 3, the top side of the HMM 15 is the thermally active section 100. However, any or all of the other sides could also or alternatively be formed as the thermally active section. Moreover, in some cases, specific portions of one or more sides of the HMM 15 can be configured as the thermally active section 100.

In some examples, in order to enable activation of the thermally active section 100 of the HMM 15 at a particular frequency or frequency band, the thermally active section 100 of the HMM 15 may be made, at least in part, by employing a thermally conductive base matrix that can be fortified with at least one type of particulate (or other finely ground material). The thermally conductive properties of the base matrix may or may not be conducive to dispersion of thermal energy across the thermally active section 100 of the HMM 15, such would depend on the desired effect of the HMM 15 in a given cooking configuration and process. When the thermally active section 100 of the HMM 15 is exposed to the particular frequency or frequency band of RF energy 70, the particulate material may absorb the RF energy 70 and transform the RF energy 70 into thermal energy that can be transferred to the surface of the food product 60 that is in contact with the thermally active section 100 as conductive or convective heat energy 80 in order to brown the surface of the food product 60.

The particulate material or materials may be mixed into the base matrix in any desirable concentration and formed into a thermally active section 100 of the HMM 15 that is suitable for forming a part of the surface of the HMM 15. Binders and/or filler materials may be provided in some cases. As shown in FIG. 3, the resulting structure may form all or part of the thermally active section 100. In some cases, the resulting structure forming the thermally active section 100 of the HMM 15 may be embodied as a rigid component suitable for supporting one or a plurality of instances of the food product 60 (i.e., the base of the HMM 15). However, in other example embodiments, the resulting structure forming the thermally active section 100 of the HMM 15 may also be a flexible component suitable for being a cover portion of the HMM 15 or being wrapped around a portion of the food product 60. The base matrix may be applied to cardboard, paper, plastic or other surfaces as a substrate or laminate in some cases. Thus, the materials used for the substrate or laminate can be selected so that the HMM 15 can be either a reusable or disposable container.

The frequency applied to or amount of RF energy 70 that is absorbed by the thermally active section 100 of the MINI 15 may be determined by: 1) the type of particulate material that is provided in the base matrix; 2) the relative quantity of particulate material that is provided in the base matrix; and 3) the regional concentration of the particulate material throughout the base matrix. Accordingly, by altering the particulate material or the concentration of the particulate material in different regions or zones of the thermally active section 100 of the MINI 15, corresponding different heat transformation rates and/or properties may be achieved. As such, for example, if the entirety of the MINI 15 has the same concentration of the material throughout the base matrix, then the rate of conversion of RF energy 70 into thermal energy (e.g., conductive/convective energy 80) may be uniform over the entire surface of the thermally active section of the HMM. However, by creating regions of the thermally active section of the HMM 15 that have different particulate concentrations of the particulate material in the base matrix, corresponding different regions with different heat transformation properties may be provided. Therefore, because the thermally active section of the HMM 15 is sometimes configured to enable browning of the surface of the food product 60 in contact with the thermally active section 100 of the HMM 15, the different regions, if created, may enable grill marks, shapes, logos, or various designs to be created on the surface of the food product 60. However, in other cases, heat application may be achieved via the thermally active section 100 for purposes other than browning.

Accordingly, in an example embodiment, the thermally active section 100 of the HMM 15 may be fabricated to have any desirable properties or configuration relative to the provision of regions that can be considered to be separate heat zones. In this regard, during fabrication, the base matrix can be provided with specific regions having corresponding specific desirable shapes that can be provided with different particulate materials or different concentrations of the same particulate material to create custom designed heat zones. Regions having a first particulate material or higher concentrations of the same particulate material will transform RF energy 70 into thermal energy (e.g., conductive/convective energy 80) at a different rate than regions having a second particulate material or lower concentrations of the same particulate material. For example, the regions having higher concentrations may be considered to be hotter zones than the regions having the lower concentrations. Different zones may be distributed to different portions of the HMM 15 to contact corresponding different portions of the food product 60 to achieve various different results for browning and heating of the food product 60.

Figure 4:
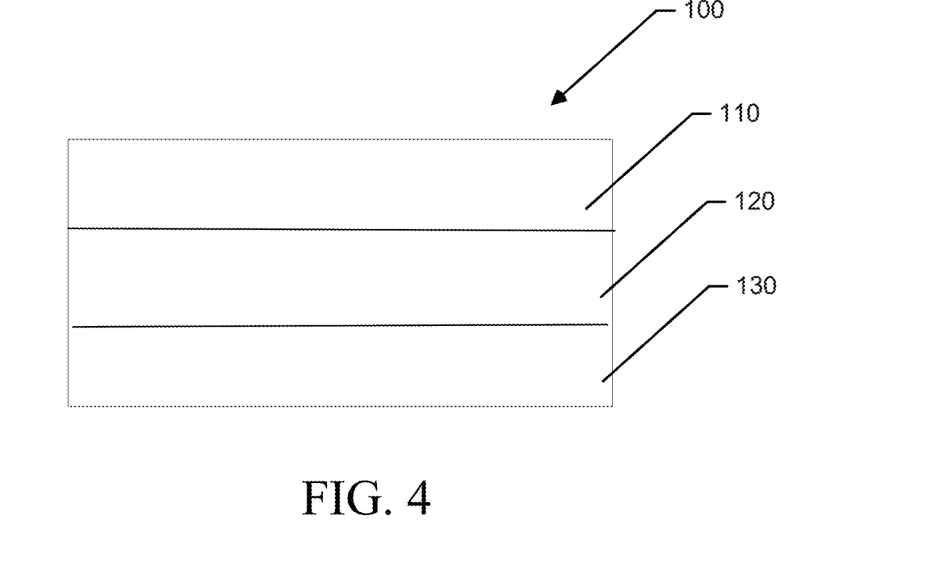
FIG. 4 illustrates a perspective view of an alternative design for a thermally active section of a heat modulating material according to an example embodiment.

FIG. 4 illustrates a perspective view of one example embodiment of the thermally active section 100 that may include multiple heat zones. In the example of FIG. 4, the thermally active section 100 includes a first heat zone 110, a second heat zone 120, and a third heat zone 130. The first heat zone 110 may have a first concentration of the particulate material, the second heat zone 120 may have a second concentration of the particulate material, and the third heat zone 130 may have a third concentration of the particulate material. The first, second, and third concentrations may each be different from each other. For example, the first concentration may be higher than the second concentration, which may be higher than the third concentration. In the example of FIG. 4, an overall heat gradient may be created from left to right (or front to back) across the thermally active section 100. In other example embodiments, the first heat zone 110, the second heat zone 120, and the third heat zone 130 may each have different particulate materials.

Figure 5:
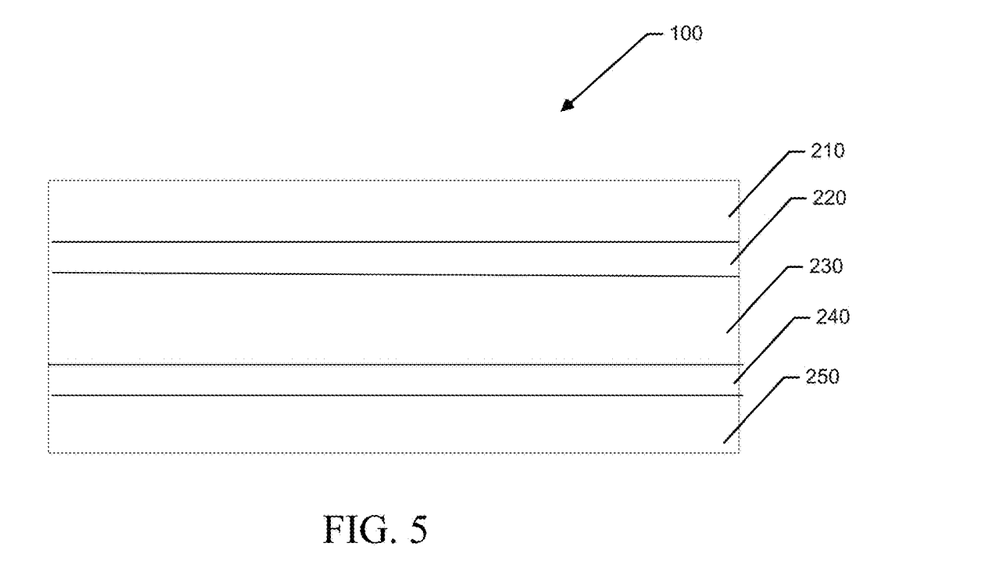
FIG. 5 illustrates a perspective view of another alternative design for a thermally active section of a heat modulating material according to an example embodiment.

In the example of FIG. 5, the sizes and shapes of the first, second and third heat zones 110, 120 and 130 are each similar (e.g., rectangular shapes of substantially the same size). However, it should be appreciated that the sizes and shapes could be different as well. FIG. 5 illustrates an example of the thermally active section 100 that may include multiple heat zones that can have different sizes. In the example of FIG. 5, the thermally active section of the HMM 15 includes a first heat zone 210, a second heat zone 220, a third heat zone 230, a fourth heat zone 240 and a fifth heat zone 250. Each of the heat zones may have a different concentration of particulate material. However, in this example, the first and fifth heat zones 210 and 250 may have the same concentration (e.g., a first concentration) and the second and fourth heat zones 220 and 240 may have the same concentration (e.g., a second concentration), and the third heat zone 230 may have a third concentration. Again, the first, second, and third concentrations may each be different from each other. For example, the third concentration may be higher than the second concentration, which may be higher than the first concentration. In the example of FIG. 5, the hottest portions or zones may be centrally located. However, this pattern could be reversed. In this example, although the sizes of the heat zones are not all the same, the areas of heat zones having the same concentration may be equal. In other example embodiments, the first and fifth heat zones 210 and 250 may have a first particulate matter and the second and fourth heat zones 220 and 240 may have a second particulate matter and the third heat zone 230 may have a third particulate matter. In some cases, the first, second, or third particulate matter may each be different. However, in others cases, the first and fifth heat zones 210 and 250 and the second and fourth heat zones 220 and 240 may contain the same particulate matter, but the first and fifth heat zones 210 and 250 may contain a first concentration of the same particulate matter and the second and fourth heat zones 220 and 240 may contain a second concentration of the same particulate matter while the third heat zone 230 contains a different particulate matter from the first, second, fourth, and fifth heat zones 210, 220, 240, and 250.

In the example of FIG. 5, the hottest portions or zones may be centrally located. However, this pattern could be reversed. In this example, although the sizes of the heat zones are not all the same, the areas of heat zones having the same particulate matter or the same concentration of the same particulate matter may be the same size.

Figure 6:
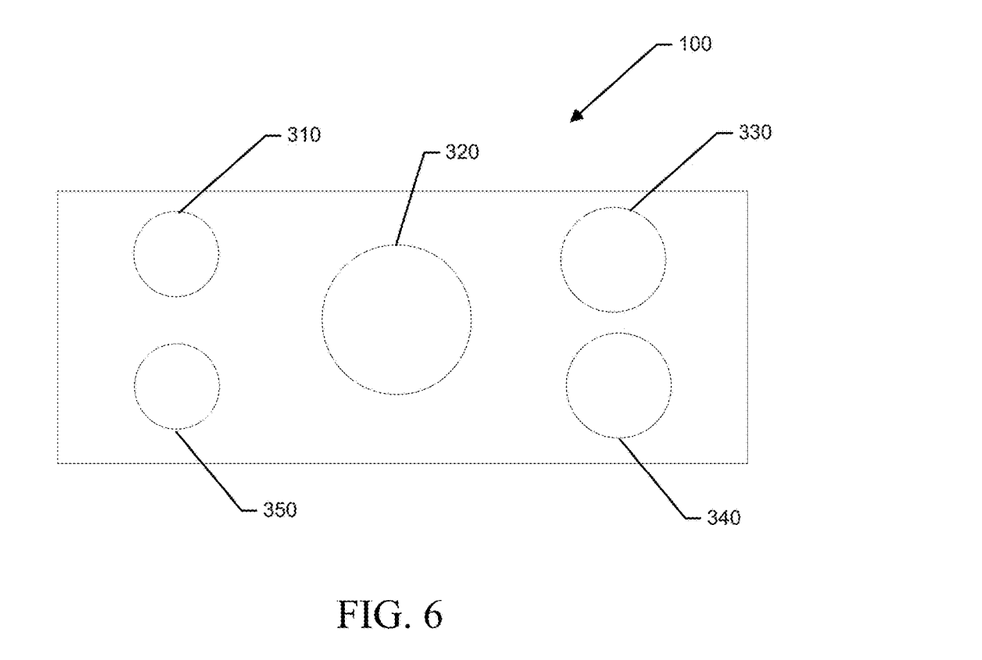
FIG. 6 illustrates a perspective view of yet another alternative design for a thermally active section of a heat modulating material according to an example embodiment.

FIG. 6 illustrates an example embodiment with different shaped heat zones. In the example of FIG. 6, the thermally active section of the HMM 15 includes a first heat zone 310, a second heat zone 320, a third heat zone 330, a fourth heat zone 340 and a fifth heat zone 350. The heat zones of FIG. 6 are each circular in shape, and each of the heat zones may have a different concentration. However, in this example, the first and fifth heat zones 310 and 350 may have the same concentration (e.g., a first concentration) and the third and fourth heat zones 330 and 340 may have the same concentration (e.g., a second concentration), and the second heat zone 320 may have a third concentration. Again, the first, second, and third concentrations may each be different from each other. For example, the third concentration may be higher than the second concentration, which may be higher than the first concentration. The sizes of each of the heat zones may be the same, or different. In an example embodiment, sizes of each of the heat zones may decrease as distance from one side (e.g., the front) of the thermally active section 100 increases. Again, instead of having different concentrations of the same particulate matter, some or all of the heat zones may contain different particulate materials. In some embodiments, the area outside the first, second, third, fourth and fifth heat zones 310, 320, 330, 340 and 350 may define a separate heat zone (e.g., a sixth heat zone 360) having a different concentration of the same particulate matter, a different particulate matter, or it may not have any particulate material therein.

Figure 7:
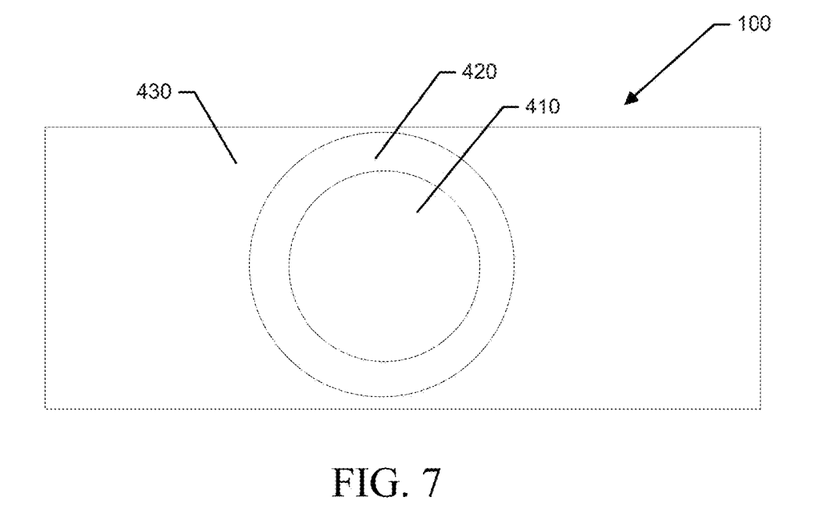
FIG. 7 illustrates a perspective view of still another alternative design for a thermally active section of a heat modulating material according to an example embodiment.

In some cases, rather than dispersing the different heat zones in different regions or areas that are separated from each other (as shown in FIG. 6) the heat zones could be concentric. FIG. 7 illustrates an example of the thermally active section 100 that includes a first heat zone 410, a second heat zone 420, and a third heat zone 430 that are arranged to be concentric with each other. The first heat zone 410 may have a first concentration of particulate material, the second heat zone 420 may have a second concentration of particulate material, and the third heat zone 430 may have a third concentration of particulate material. The first, second, and third concentrations may each be different from each other. For example, the first concentration may be higher than the second concentration, which may be higher than the third concentration. In the example of FIG. 7, an overall heat gradient may be created that decreases as distance from the center of the thermally active section 100 increases. The outer shapes of the first and second heat zones 410 and 420 may be circular and have increasing respective diameters. However, the first heat zone 410 is concentric with the second heat zone 420. Meanwhile, the third heat zone 430 may extend around all portions of the second heat zone 420 and have a different shape (e.g., rectangular). Again, instead of the heat zones having different concentrations of the same particulate material, some or all of the heat zones may contain different particulate materials. In some cases, the particulate materials may be selected in order to create a heat gradient that decreases as distance from the center of the thermally active section 100 increases.

Figure 8:
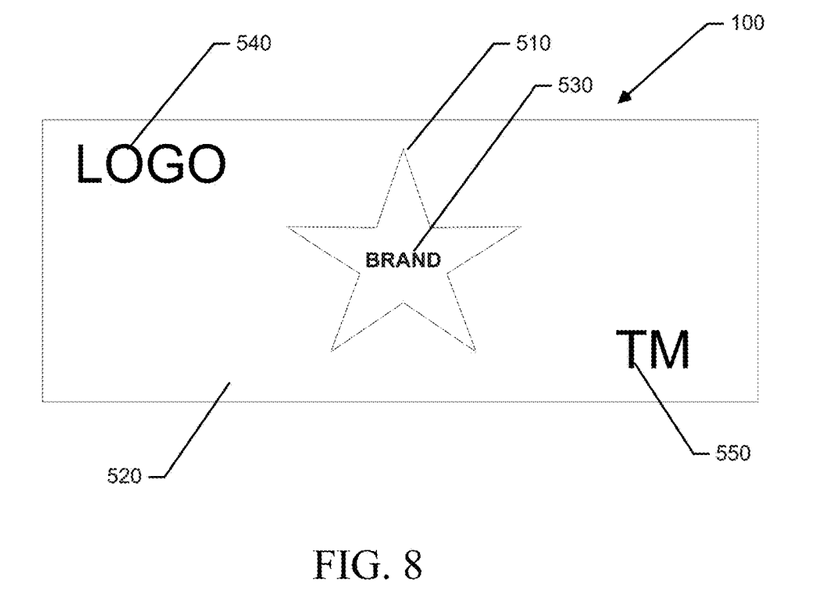
FIG. 8 illustrates a perspective view of another alternative design for a thermally active section of a heat modulating material according to an example embodiment.

The heat zones can also have more custom shapes, or even shapes that include brands or logos. FIG. 8 illustrates an example in which the thermally active section 100 includes a first heat zone 510 and a second heat zone 520 with different concentrations of the same particulate matter. In the example of FIG. 8, branding information 530, a logo 540, or a trademark 550 may be provided in either or both of the heat zones 510 or 520. The branding information 530, logo 540, or trademark 550 could have the same concentrations as their surrounding areas and therefore just be cosmetic enhancements. However, in other examples, the branding information 530, the logo 540, or the trademark 550 could have different concentrations of the same particulate material from their surrounding areas and therefore be functional enhancements in addition to providing cosmetic differences. In other example embodiments, the branding information 530, logo 540, or trademark 550 could contain different particulate materials from their surrounding areas in order to create functional enhancements in addition to the cosmetic differences.

Figure 9:
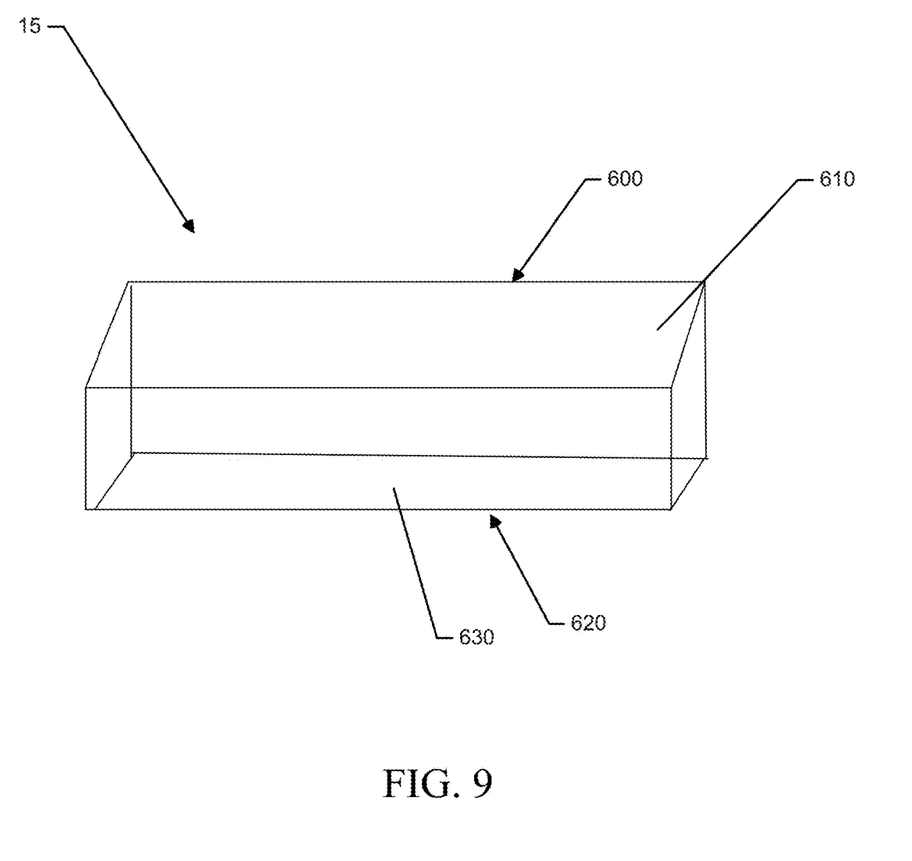
FIG. 9 illustrates a perspective view of a heat modulating material according to an example embodiment.

While the above examples are directed to a HMM 15 having only one thermally active section 100, it should be understood that the HMM 15 may contain a plurality of thermally active sections 100. Each thermally active section 100 may contain one heat zone or various heat zones as described above. For example, as shown in FIG. 9, the HMM may contain a cover portion 600 and a base portion 630. The cover portion 600 may form a first thermally active section 610 and the base portion may form a second thermally active section 620.

An oven 1 of an example embodiment may therefore be configured to use one energy source (or at least one type of energy application source (RF)) to generate heat for cooking a food product 60 by two different methods (RF and conduction/convection). In particular, the oven 1 may be configured to receive a HMM 15 that contains food product 60 and that has a thermally active section that is configured to have a heat zone or a plurality of heat zones that have different heat application properties. The cooking controller 40 of the oven 1 may be configured to direct the application of one frequency or frequency band or multiple frequencies frequency bands in order to both directly and indirectly (i.e., brown) heat the food product 60. In some cases, one frequency or frequency band may be used to directly heat the food product 60 contained in the MEW 15. The other frequency may be used to indirectly heat the surface of the food product 60 in contact with the thermally active section 100 of the HMM 15 based on converting the energy associated with the second frequency into thermal energy to be conductively or convectively applied at or near the surface of the food product 60.

Figure 10:
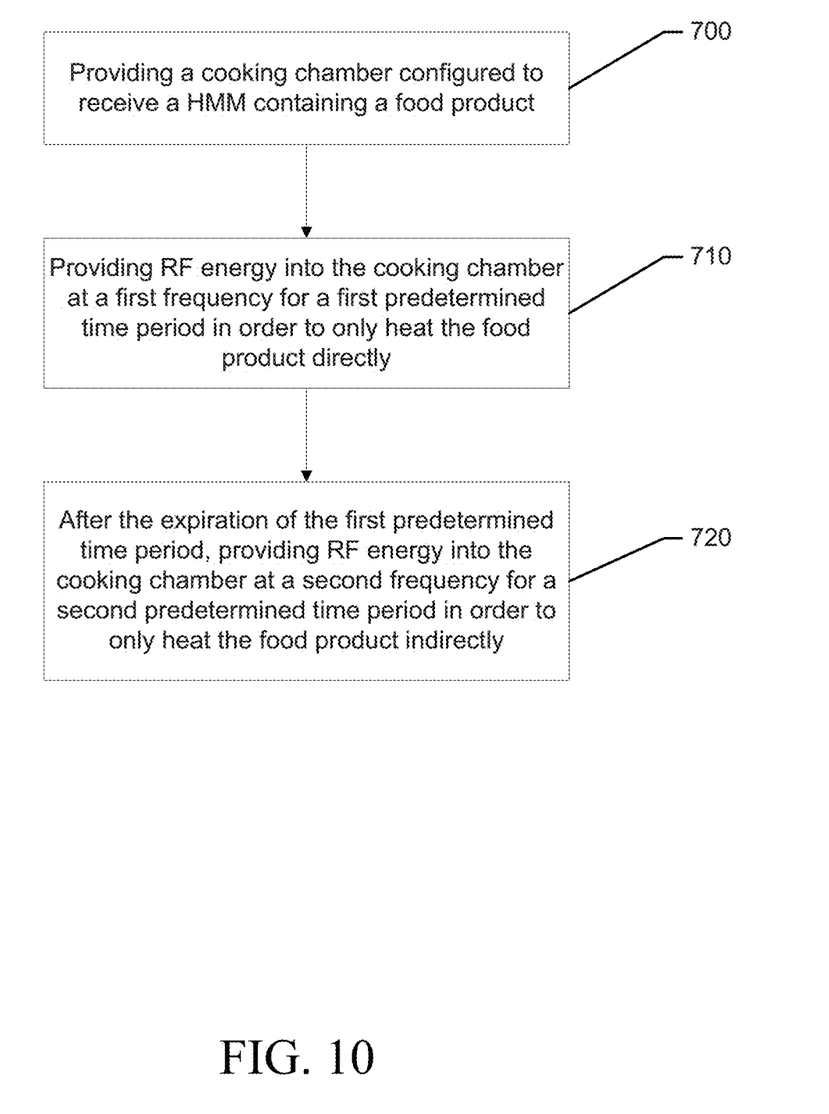
FIG. 10 illustrates a block diagram of a method of executing a cooking program according to an example embodiment.

FIG. 10 illustrates a block diagram of a method of cooking and browning the food product 60 contained in the HMM 15 via the sequential activation program. As shown in FIG. 10, the method may include providing a cooking chamber configured to receive the HMM, and thereby the food product, at operation 700. At operation 710, RF energy may be provided into the cooking chamber at a first frequency for a first predetermined time period in order to only heat the food product directly. At operation 720, after the expiration of the first predetermined time period, RF energy may be provided into the cooking chamber at a second frequency for a second predetermined time period in order to only heat the food product indirectly. The indirect heating of the food product may occur in response to the particulate material of the base matrix of the thermally active section absorbing the second frequency to transform the RF energy into thermal heat generation.

Figure 11:
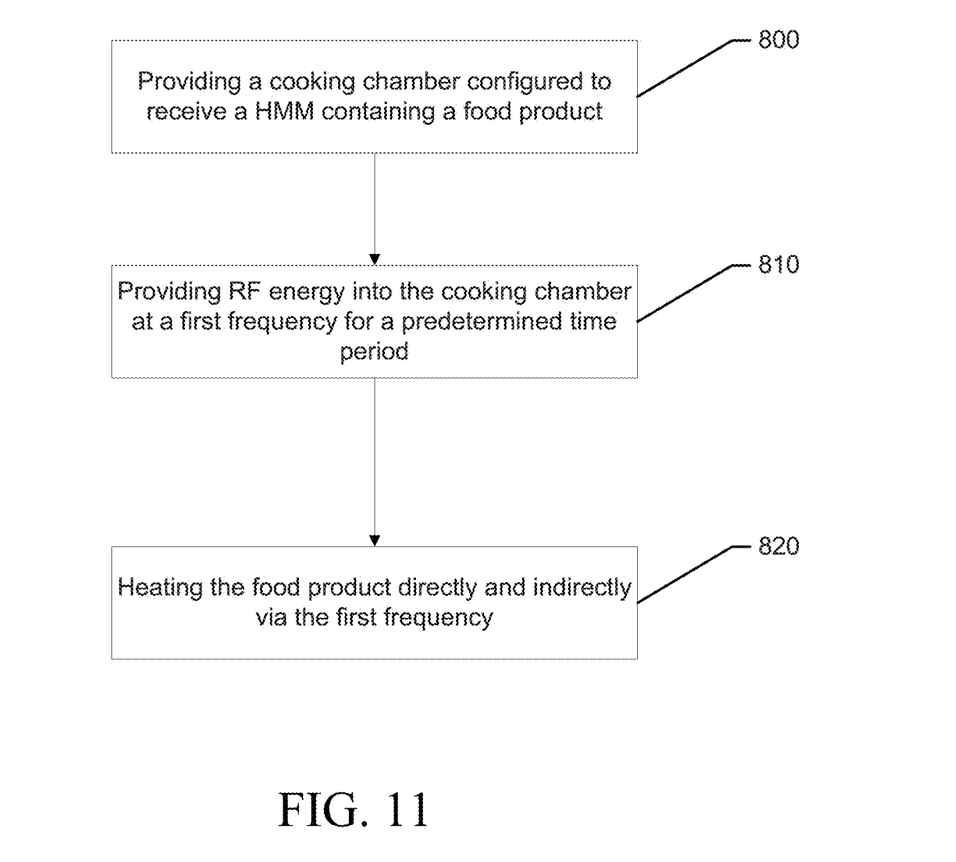
FIG. 11 illustrates a block diagram of method of executing another cooking program according to an example embodiment.

FIG. 11 illustrates a block diagram of a method of cooking and browning the food product 60 contained in the HMM 15 via the sequential activation program. As shown in FIG. 11, the method may include providing a cooking chamber configured to receive the HMM, and thereby the food product, at operation 800. At operation 810, RF energy may be provided into the cooking chamber at a first frequency for a first predetermined time period. At operation 820, the food product may be both heated directly and indirectly via the first frequency. The indirect heating of the food product may occur in response to the particulate material of the base matrix of the thermally active section absorbing the first frequency to transform the RF energy into thermal heat generation.

Figure 12:
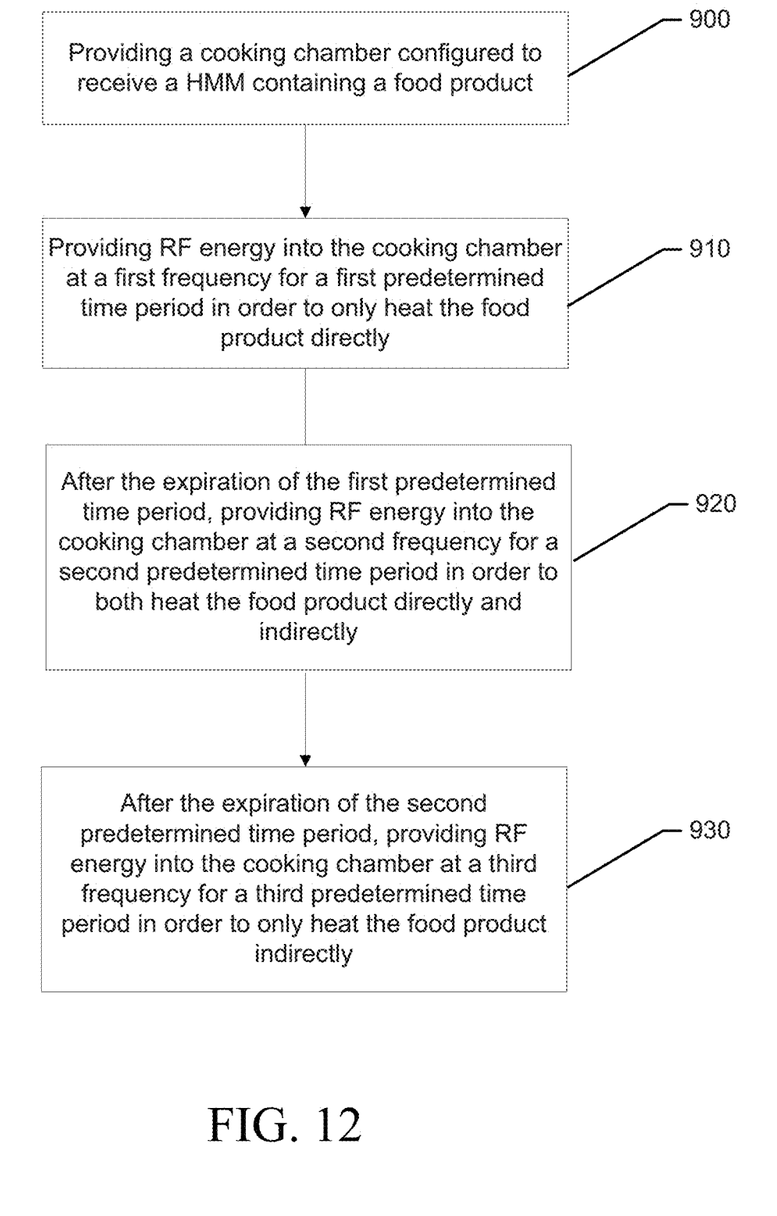
FIG. 12 illustrates a block diagram of a method of executing yet another cooking program according to an example embodiment.

FIG. 12 illustrates a block diagram of a method of cooking and browning the food product 60 contained in the HMM 15 via the sequential activation program. As shown in FIG. 12, the method may include providing a cooking chamber configured to receive the HMM, and thereby the food product, at operation 900. At operation 910, RF energy may be provided into the cooking chamber at a first frequency for a first predetermined time period in order to only heat the food product directly. At operation 920, after the expiration of the first predetermined time period, RF energy may be provided into the cooking chamber at a second frequency for a second predetermined time period in order to both directly and indirectly heat the food product. At operation 930, after the expiration of the second predetermined time period, RF energy may be provided into the cooking chamber at a third frequency for a third predetermined time period in order to only indirectly heat the food product. The indirect heating of the food product may occur in response to the particulate material of the base matrix of the thermally active section absorbing the second and third frequency to transform the RF energy into thermal heat generation.

In some cases, the method may include various modifications, additions or augmentations that may optionally be applied. Thus, for example, in some cases, heating the food product indirectly may include heating the food product indirectly at a different rate based on a corresponding heat zone of the oven at which the food product is placed. In some cases, the energy conversion assembly may include a first heat zone having a first concentration of the ferromagnetic particulate material therein, and a second heat zone having a second concentration of the ferromagnetic particulate material therein. The first and second concentrations may be different from each other. In some embodiments, the energy conversion assembly may be preheated prior to the food product being received in the cooking chamber.

Example embodiments define heat zones of the thermally active section based on the type, amount, and placement of particulate material within a base matrix during the manufacture of the thermally active section of the HMM. Accordingly, different food products contained in the HMM may be simultaneously cooked, but may receive different amounts of thermal energy within the same cooking chamber, in order to brown the surface of the food product.

Example embodiments may therefore enable, targeting a food mass (for direct cooking) and separately targeting food packaging materials (for indirect cooking) with different RF frequencies to cook food and activate packaging functionality simultaneously or sequentially. The process may be driven by a particular algorithm defining the ability to have one frequency (or range) for cooking a food product and another, independently controllable frequency (or range), to heat a material in contact with the food product) as described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A heat modulating material (HMM) for use in an oven and configured to contain a food product, the HMM comprising a thermally active section, the thermally active section comprising:
   a base matrix; and
   a particulate material dispersed in the base matrix, the particulate material being configured to differently absorb at least some RF energy provided in a cooking chamber of the oven to transform the RF energy into thermal energy for indirectly heating the food product and allow different levels of direct RF energy to pass through the thermally active section to directly heat the food product responsive to different respective frequencies of the RF energy being received at the thermally active section,
   wherein the application of the RF energy is directed by a cooking controller of the oven.

2. The HMM of claim 1, wherein the thermally active section comprises a first heat zone and a second heat zone, wherein the first heat zone has a first particulate material dispersed therein, and the second heat zone has a second particulate material dispersed in therein, the first particulate material and the second particulate material being different from each other.

3. The HMM of claim 2, wherein the first and second heat zones are substantially equal in size and shape.

4. The HMM of claim 2, wherein the first and second heat zones are different in size and shape.

5. The HMM of claim 1, wherein the thermally active section comprises a first heat zone and a second heat zone, wherein the first heat zone has a first concentration of a first particulate material therein, and the second heat zone has a second concentration of the first particulate material therein, the first concentration and the second concentration being different from each other.

6. The HMM of claim 5, wherein the first and second heat zones are substantially equal in size and shape.

7. The HMM of claim 5, wherein the first and second heat zones are different in size and shape.

8. The HMM of claim 1, wherein the thermally active section comprises one of a plurality of different arrangements, at least one of the arrangements having branding information, logo information or trademark symbols provided therein.

9. The HMM of claim 1, wherein the thermally active section is a first thermally active section and a second thermally active section, the first section being a base portion of the HMM, and the second thermally active section being a cover portion of the MM.

10. A heat modulating material (HMM) for use in an oven and configured to contain a food product, the MINI comprising a thermally active section, the thermally active section comprising:
    a base matrix; and
    a particulate material dispersed in the base matrix, the particulate material configured to absorb at least some RF energy provided in a cooking chamber of the oven to transform the RF energy into thermal energy for indirectly heating the food product, the application of the RF energy being directed by a cooking controller of the oven, wherein the food product is directly heated by application of the RF energy at a first frequency and/or phase, and the food product is indirectly heated via the thermally active section via a second frequency and/or phase, at least one of the first and second frequencies and/or phases being different from each other while being selectively applied by the cooking controller.

11. The HMM of claim 1, wherein the thermally active section is configured to more readily absorb a first frequency of the different respective frequencies of the RF energy and the food product is configured to more readily absorb a second frequency of the different respective frequencies of the RF energy, and wherein the first and second frequencies are applied simultaneously to the thermally active section.

12. The HMM of claim 1, wherein the thermally active section is configured to more readily absorb a first frequency of the different respective frequencies of the RF energy and the food product is configured to more readily absorb a second frequency of the different respective frequencies of the RF energy, and wherein the first and second frequencies are applied in sequence to the thermally active section.

13. The HMM of claim 1, wherein the thermally active section is configured to more readily absorb a first frequency of the different respective frequencies of the RF energy and the food product is configured to more readily absorb a second frequency of the different respective frequencies of the RF energy, and wherein the first and second frequencies are applied a combination of simultaneously and in sequence to the thermally active section.

14. The HMM of claim 10, wherein the first and second frequencies are applied simultaneously to the thermally active section.

15. The HMM of claim 10, wherein the first and second frequencies are applied in sequence to the thermally active section.

16. The HMM of claim 10, wherein the first and second frequencies are applied to the thermally active section simultaneously during a first range of time and in sequence during a second range of time.

* * * * *

UNITED STATES PATENT AND TRADEMARK OFFICE
CERTIFICATE OF CORRECTION

PATENT NO. : 10,259,638 B2
APPLICATION NO. : 15/059976
DATED : April 16, 2019
INVENTOR(S) : Joshua M. Linton et al.

Page 1 of 1

It is certified that error appears in the above-identified patent and that said Letters Patent is hereby corrected as shown below:

In the Claims

In Column 14, Line 57, in Claim 10, "and configured to contain a food product, the MINI com-" should read --and configured to contain a food product, the HMM com- --.

Signed and Sealed this
First Day of October, 2019

Andrei Iancu
*Director of the United States Patent and Trademark Office*